United States Patent [19]
Carroll et al.

[11] 3,806,613

[45] Apr. 23, 1974

[54] PROCESS FOR PREPARING A FORTIFIED CEREAL GRAIN PRODUCT

[75] Inventors: Leo P. Carroll, Fox River Grove; John C. Novotny, McHenry; Anthony W. Richards, Fox River Grove, all of Ill.

[73] Assignee: The Quaker Oats Company, Chicago, Ill.

[22] Filed: Feb. 22, 1972

[21] Appl. No.: 228,310

[52] U.S. Cl. .................. 426/302, 426/72, 426/73, 426/97, 426/309
[51] Int. Cl. ............................................ A23l 1/10
[58] Field of Search .......................... 99/11, 83, 2 V

[56] References Cited
UNITED STATES PATENTS

| | | | |
|---|---|---|---|
| 2,712,499 | 7/1955 | LaCierre | 99/11 |
| 2,775,521 | 12/1956 | Mateles et al. | 99/11 |
| 2,831,770 | 4/1958 | Antoshin | 99/11 |

*Primary Examiner*—Raymond N. Jones
*Attorney, Agent, or Firm*—Donnie Rudd; Grace J. Fishel

[57] ABSTRACT

A process is disclosed for producing an iron fortified cereal grain product by applying a slurry of reduced iron in an edible fatty acid ester of glycerol or sorbitol to a cereal grain.

1 Claim, No Drawings

PROCESS FOR PREPARING A FORTIFIED CEREAL GRAIN PRODUCT

BACKGROUND OF THE INVENTION

1. Field of the Invention

This invention relates to an iron fortified cereal grain product.

2. Description of the Prior Art

Cereal grain products such as white rice, corn meal, corn grits, barley, farina and the like are generally prepared for consumption by removing parts of the cereal grain by dehulling, degerminating or fractionating techniques. The milling process in common use reduces many of the vitamin and mineral constitutents of the natural grains.

Over the years many procedures have been developed for adding vitamins and minerals to grain products. Usually these procedures consist of commingling vitamins and minerals with the grain product or less commonly consist of applying thin films of water, gum, zein, shellac, etc. by which the vitamins and minerals are bonded to the grain product.

The above procedures work quite well when the fortifying form of iron is ferrous sulfate, ferrous gluconate, ferrous fumarate, ferric orthophosphate, sodium iron pyrophosphate, etc. but are unsatisfactory for the addition of large amounts of reduced iron. Reduced iron in amounts in the order of 100 to 200 milligrams per pound when applied by conventional procedures noticeably tends to separate from the fortified grain product during shipment and accumulate in the bottom of the package.

Reduced iron is a physiologically available form of iron which is less expensive per unit of iron than any of the above mentioned iron salts and is less likely to cause problems such as rancidity and off colors. In view of the above, there currently exists a need for a satisfactory method of applying reduced iron to grain products so that the reduced iron does not separate from the product upon shaking and as in shipping.

SUMMARY OF THE INVENTION

It is an object of this invention to provide a grain product fortified with reduced iron which does not separate therefrom during handling.

Another object of this invention is to provide a process for applying reduced iron to grain products so that the reduced iron is distributed over the cereal grain product and does not separate therefrom during handling.

Still another object of this invention is to provide a process which is capable of producing a coating containing reduced iron which is inconspicuous and does not interfere with the "cook" and the visual or organoleptic acceptance of the cereal grain product.

The objects of this invention are accomplished by a cereal grain product having a slurry of reduced iron in an edible fatty acid ester of glycerol or sorbitol dispersed thereon, said edible ester having a melting point below 125°F. and comprising 0.15 percent to 5.0 percent by weight of the cereal.

The objects of this invention are further accomplished by a process for preparing fortified cereal grain products which comprises applying in liquid form to the surface of the cereal grain product a slurry of reduced iron and an edible ester of glycerol or sorbitol and a fatty acid; said edible ester having a melting point below 125°F. and comprising 0.15 percent to 5.0 percent by weight of the cereal grain product.

In this application the words "cereal grain product" includes such products as white rice, corn grits, corn meal, barley and the like, but is in no way limited to those materials. By "an edible ester of glycerol or sorbitol and a fatty acid" we mean to include any animal or vegetable oil, natural or hydrogenated of an edible type and having a melting point below about 125°F., preferably below 80°F. Suitable edible esters include shortening, lard, butter, coconut oil, cotton seed oil, soybean oil, palm oil, corn oil, peanut oil, sunflower seed oil, safflower oil, olive oil, and the like, or mixtures thereof. As indicated above, suitable esters may be based on fatty acids which include those having about 12 to 20 carbon atoms such as stearic acid, palmitic acid, myristic acid, and lauric acid for example.

We also mean to include edible esters of glycerol and sorbitol having a melting point below 125°F. such as Atmos 300, Tween 20, and Tween 60 sold by Atlas Chemical Industries, Inc., Wilmington, Del. Atmos 300 is a mixture of mono- and diglycerides which is formed by the reaction of glycerol mono-oleate with oleic acid, palmitic acid, and stearic acid, is a light amber liquid, and has a viscosity of 150 centipoises at 75°F. Tween 20 is a polyoxyethylene sorbitan monolaurate which is a yellow liquid at 75°F. having a viscosity of 360 centipoises. Tween 60 is a polyoxyethylene sorbitan monostearate which is a yellow liquid at 75°F. having a viscosity of 600 centipoises.

The slurry of reduced iron and an edible ester of glycerol or sorbitol as used herein includes molecular dispersions (solutions), colloidal dispersions, and particulate or mechanical dispersions. The amount of finely divided reduced iron applied by our process is not narrowly limited. Amounts of reduced iron much in excess of the adult minimum daily requirement for iron per unit of the cereal grain product reasonably suited for adult consumption probably should not be applied as a matter of good nutritional policy; however, in testing our process we have found that amounts much in excess of that amount can be applied by our process. In general from about 25 mg to 1,200 mg and preferrably 80 mg to 250 mg of reduced iron per pound of cereal grain product may be applied by our process.

It is essential to our invention that the slurry contain between 0.15 percent and 5.0 percent by weight of the fatty acid ester of glycerol or sorbitol based on the weight of the cereal grain product. If much less than 0.15 percent of the edible ester is used, the reduced iron will not be effectively bound to the cereal grain product. If much more than 5.0 percent of the edible ester is used, the ester will interfere with the "cook" and the visual and organoleptic acceptance of the cereal grain product. That is, if more than 5.0 percent of the edible ester is used the grain product when coated with the slurry has an unnatural appearance best described as like wet sand. Above the 5.0 percent level the cereal grain product when cooked is oily and has an unpleasant mouth feel.

The slurry is preferably prepared by adding the reduced iron to the edible ester of glycerol or sorbitol, holding the admixture at a temperature sufficient to liquefy it, and agitating the admixture to produce the slurry. Other materials such as salt, vitamins, other minerals, antioxidants, colorants, flavorings, flavor enhancers, flavor potentiators, etc. which can be dissolved or suspended in the edible ester may be added. Temperatures above the temperature sufficient to liquefy the slurry can be used but are not necessary. When heat degradeable vitamins such as vitamin A, vitamin B, vitamin $B_{12}$, vitamin C, and vitamin D or other heat unstable materials are added to the slurry heating the slurry to temperatures much above that necessary to liquefy it or for prolonged periods of time should be avoided.

The slurry may be applied in liquid form to the cereal grain product by spraying, by tumble enrobing, or by any other conventional method. In each case the object is to evenly distribute the slurry around the product. After coating the cereal grain product with the slurry, the product is immediately ready for human or animal consumption or for packaging.

DESCRIPTION OF THE PREFERRED EMBODIMENTS

The following embodiments of this invention are shown for the purpose of illustrating the invention and demonstrating the best mode for practicing the invention. It will be apparent to those skilled in the art that various changes and modifications may be made therein without departing from the spirit and scope of the invention as it is more precisely defined in the subjoined claims.

EXAMPLE 1

A slurry was prepared from 0.10 pounds of coconut oil having a melting point of 75°F., 2,500 mg of reduced iron, and 9.0 g of a vitamin and mineral pre-mix. 10 pounds of corn grits were tumbled with 56.8 g of the oil slurry prepared above. The corn grits and oil slurry were admixed until the slurry was uniformly distributed over the surface of the cereal product.

The enriched cereal product was packaged and subjected to a 1,000 mile simulated rail trip. To determine the amount of separation of the reduced iron from the corn grits, samples were taken from the top, center, and bottom of the package and analyzed for reduced iron. The results are reported in Table I below.

EXAMPLE 2

The procedure of Example 1 was repeated in this example except that 10 pounds of farina was substituted for the corn grits. The results are reported in Table I.

EXAMPLE 3

10 pounds of corn grits were tumbled with 0.10 pounds of coconut oil having a melting point of 75°F. The corn grits and the oil were admixed until the oil was uniformly distributed over the surface of the cereal product. 2,500 mg of reduced iron and 9.0 g of a vitamin and mineral pre-mix were then added and mixing continued until the mixture was uniform.

The enriched cereal product was then packaged, subjected to the 1,000 mile simulated rail trip, and samples were taken as in Example 1. The results are reported in Table I.

EXAMPLE 4

The procedure of Example 3 was repeated in this example except that 10 pounds of farina was substituted for the corn grits. The results are given in Table I.

EXAMPLE 5

10 pounds of corn grits were tumbled with 2,500 mg of reduced iron and 9.0 g of a vitamin and mineral pre-mix. The tumbling was continued until the vitamins and minerals were evenly mixed with the corn grits. 0.10 pounds of coconut oil having a melting point of 75°F. were then added and the tumbling continued until the oil was uniformly distributed over the surface of the cereal product. The results are given below in Table I.

EXAMPLE 6

The procedure of Example 5 was repeated in this example except that 10 pounds of farina was substituted for the corn grits. The results are reported in Table I.

TABLE I

| Example No. | Top mg Fe/lb | Sample Middle mg Fe/lb | Bottom mg Fe/lb |
| --- | --- | --- | --- |
| 1 | 264 | 254 | 278 |
| 2 | 217 | 254 | 281 |
| 3 | 195 | 213 | 315 |
| 4 | 185 | 184 | 303 |
| 5 | 250 | 279 | 423 |
| 6 | 363 | 449 | 694 |

Examples 1-2 inclusive when compared with Examples 3-6 inclusive, demonstrate the benefit enjoyed by practicing our invention. Samples taken from Examples 1 and 2 show that substantially no separation of the reduced iron from the cereal grain product occurred during the simulated rail trip. Samples from Examples 3-6 inclusive show that samples not produced in accordance with our invention suffered separation of the reduced iron from the cereal grain product.

Examples 1-2 inclusive demonstrate the criticality of the sequence of steps in our method. We have found that it is absolutely essential to prepare first a slurry of the reduced iron in the above mentioned edible ester and second to apply the slurry to the cereal grain product to be enriched. Other sequences of steps as demonstrated by Example 3-6 inclusive result in an iron enriched cereal product from which the reduced iron separates during handling.

From the foregoing description we consider it to be clear that the present invention contributes a substantial benefit to the cereal art by providing a new and useful process for fortifying cereal grain products with reduced iron.

We claim:

1. A process for preparing iron fortified cereal grain products which comprises applying in liquid form to the surface of the cereal grain product, a slurry comprising an iron compound and an edible ester of glycerol or sorbitol and a fatty acid, said iron compound consisting essentially of reduced iron and said iron being applied in an amount of from 25 miligrams to 1,200 miligrams per pound of the cereal grain product and said edible ester having a melting point below 125°F. and comprising from 0.15 percent to 5.0 percent by weight of the cereal product and said glycerol ester being a member selected from the group consisting of shortening, lard, butter, coconut oil, cottonseed oil, soybean oil, palm oil, corn oil, peanut oil, sunflower seed oil, safflower oil, and olive oil.

* * * * *